US009110871B2

(12) United States Patent
Sata et al.

(10) Patent No.: US 9,110,871 B2
(45) Date of Patent: Aug. 18, 2015

(54) CORRECTING A DOCUMENT CHARACTER SIZE BASED ON THE AVERAGE VALUE OF EACH CHARACTER SIZE

(75) Inventors: Ichiko Sata, Osaka (JP); Takeshi Kutsumi, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 931 days.

(21) Appl. No.: 13/292,125

(22) Filed: Nov. 9, 2011

(65) Prior Publication Data

US 2012/0117461 A1 May 10, 2012

(30) Foreign Application Priority Data

Nov. 10, 2010 (JP) .................................. 2010-251375

(51) Int. Cl.
*G06F 17/21* (2006.01)
*G06F 17/24* (2006.01)
*G06F 17/28* (2006.01)

(52) U.S. Cl.
CPC ............ *G06F 17/214* (2013.01); *G06F 17/211* (2013.01); *G06F 17/241* (2013.01); *G06F 17/28* (2013.01)

(58) Field of Classification Search
CPC .... G06F 17/211; G06F 17/214; G06F 17/241
USPC .................. 715/244, 269, 243.246, 243, 246; 704/2, 3
See application file for complete search history.

(56) References Cited

U.S. PATENT DOCUMENTS

| 2008/0300858 A1 | 12/2008 | Konno |
| 2009/0210215 A1 | 8/2009 | Konno |
| 2010/0275111 A1* | 10/2010 | Bastos dos Santos et al. ............... 715/227 |

FOREIGN PATENT DOCUMENTS

| JP | 6-20091 | 1/1994 |
| JP | 7-121539 A | 5/1995 |
| JP | 2008-299780 A | 12/2008 |
| JP | 2009-80727 A | 4/2009 |
| JP | 2009-193283 A | 8/2009 |
| JP | 2010-128599 A | 6/2010 |

* cited by examiner

*Primary Examiner* — Cesar Paula
*Assistant Examiner* — Konrad Kulikowski
(74) *Attorney, Agent, or Firm* — Birch, Stewart, Kolasch & Birch, LLP

(57) ABSTRACT

A document generating apparatus and a document generating method capable of easily and effectively generating a document with a supplementary explanation in which a supplementary explanation character string is given in a ruby form in a character size which conforms to a character size of a document. The document generating apparatus (and method thereof) decides, for each line, a character size for characters included in each line in each character area, and corrects information on the character size based on the calculated value of the character size.

12 Claims, 5 Drawing Sheets

CORRECTING A DOCUMENT CHARACTER SIZE BASED ON THE AVERAGE VALUE OF EACH CHARACTER SIZE

CROSS-NOTING PARAGRAPH

This non-provisional application claims priority under 35 U.S.C. §119(a) on Patent Application No. 2010-251375 filed in JAPAN on Nov. 10, 2010, the entire contents of which are hereby incorporated herein by reference.

FIELD OF THE INVENTION

The present invention relates to a document generating apparatus, a document generating method for generating a document with a supplementary explanation by giving a supplementary explanation character string in a ruby form alongside a character included in a document, a computer program characterized by causing a computer to execute the document generating method, and a computer-readable recording medium characterized by recording of the computer program.

BACKGROUND OF THE INVENTION

Conventionally, a character recognition technique is widely used for performing character recognition of an original document image including characters to make the recognized characters into text. Additionally, an automatic translation technique is also used for translating a character string of a first language into a character string of a second language. Further, a technique in which the character recognition technique and the automatic translation technique are combined is also practically used. In this technique, character recognition is performed for a document image acquired by scanning of a paper document, while the recognized characters are made into text to generate an image displaying a translated sentence of the text together with an original sentence. Moreover, a technique has been proposed for deciding a character size of a translated sentence corresponding to a character size of an original sentence when the translated sentence is displayed together with the original sentence.

For example, in a document image processing apparatus disclosed in Japanese Laid-Open Patent Publication No. 2010-128599, layouts of a document area, an image area and the like are analyzed, one or a plurality of sentence areas including character strings is/are set, the character strings included in each sentence area are recognized, and translation of the recognized character strings is performed. Then, this document image processing apparatus classifies each sentence area into one or a plurality of groups based on a character size and a line space of each sentence area, decides a character size of a translation character string for each of these groups, and arranges the translation character string in the decided character size to generate an image to which a translated sentence is added.

Here, the document image processing apparatus sets the character size of the translation character string to the same size as a character size of an original sentence. In a case where it is impossible to arrange the translation character string between lines of the original sentence in this size, the document image processing apparatus sets the character size of the translation character string to the size within a fittable range between lines of the original sentence. In this case, average values of a character size and a line space in character recognition are used as values of the character size and the line space of the original sentence in each sentence area.

Further, this document image processing apparatus calculates a rate of areas covered by character strings of the original sentences and the translated sentences in a document image after the character size of the translation character string is decided, and performs correction of the character size of the translation character string based on this rate. Specifically, the document image processing apparatus maintains readability by making the translation character string in a maximum character size into the one in a smaller size or making the character sizes of the whole of the translation character strings into a smaller size in a case where the above-described rate is large.

However, with the technique of the above-described Japanese Laid-Open Patent Publication No. 2010-128599, there has been a case where it becomes difficult to perform arrangement of the translation character string in a character size appropriate for each document area.

For example, when an original document has a complicated layout, character sizes are different, vacant lines or the like are included in one sentence area. Furthermore, there are some cases where in character recognition processing, an image part which is not an actual character is recognized as a character or there exist errors in character sizes of an original sentence that is acquired from a result of the character recognition processing.

Therefore, when an average value of character sizes of an original sentence is calculated by sentence area, there is a possibility that the average value becomes a completely different value compared to a trend of actual character sizes. As a result, a character size of a translation character string that is decided by sentence area is inappropriate and the character size of the translation character string is too large or too small compared to the character sizes of the original document so that a readability of a document gets worse.

Additionally, since correction of a character size of a translation character string is performed by group in which respective sentence areas are classified, when a character string in a small character size or a narrow space between lines is locally present in one sentence area, there may be a possibility that the translation character string is arranged in a character size which is too large for them. Moreover, when a character string in a large character size or a wide space between lines is locally present in one sentence area, there may be a possibility that the translation character string is arranged in a character size which is too small for them.

SUMMARY OF THE INVENTION

An object of the present invention is to provide a document generating apparatus and a document generating method capable of easily and effectively generating a document with a supplementary explanation in which a supplementary explanation character string is given in a ruby form in a character size which conforms to a character size of a document, a computer program characterized by causing a computer to execute the document generating method, and a computer-readable recording medium characterized by recording of the computer program.

An object of the present invention is to provide a document generating apparatus for generating a document with an supplementary explanation by giving a supplementary explanation character string in a ruby form alongside a character included in a document, comprising: a storage portion for storing information on a character size of a character included in a character area in the document; a character size correcting portion for reading the information on the character size from the storage portion and correcting the read information on the character size for each character area based on a character size of each character area; a character area dividing portion for dividing one character area into more than one character area based on information on a character size corrected by the character size correcting portion; a display form information generating portion for generating, when information on a character size is corrected by the character size correcting portion for characters in a character area made by division by the character area dividing portion, information on a display form of the supplementary explanation character string for each character area made by division by the character area dividing portion based on information on the corrected character size; and a document generating portion for generating the document with the supplementary explanation based on information on a display form generated in the display form information generating portion.

Another object of the present invention is to provide the document generating apparatus, wherein the character size correcting portion decides, for each line, a character size for characters included in each line in each character area, calculates an average value of the decided character size for each character area, and corrects information on the character size based on the calculated average value of the character size.

Another object of the present invention is to provide the document generating apparatus, wherein the character size correcting portion calculates, when there is a line in which the number of characters does not satisfy a predetermined threshold, an average value of the character size excluding the line.

Another object of the present invention is to provide the document generating apparatus, wherein the character size correcting portion compares, in the case of calculating an average value of each character size decided for successive n lines including a first line of one character area and thereafter calculating an average value of a character size decided for each line from the first line to an n+1-th line, the average value of each character size decided for the successive n lines to a character size decided for the n+1-th line, and when a difference between the average value of each character size decided for the successive n lines and the character size decided for the n+1-th line is judged large based on a predetermined condition, stops calculation of the average value of the character size decided for each line from the first line to the n+1-th line and corrects information on the character size based on the average value of each character size decided for the successive n lines.

Another object of the present invention is to provide the document generating apparatus, wherein the character area dividing portion divides, when a difference between the average value of each character size decided for the successive n lines and the character size decided for the n+1-th line is judged large based on the predetermined condition, the character area at a space between the n-th line and the n+1-th line.

Another object of the present invention is to provide the document generating apparatus, wherein the character size correcting portion calculates, when the character area is divided by the character area dividing portion, an average value of character sizes decided for lines after the n+1-th line.

Another object of the present invention is to provide the document generating apparatus, wherein the character size correcting portion calculates a weighted average value of a character size decided for each line in the character area by adding a weight of the number of characters included in each line to the character size decided for each line to correct information on the character size based on the weighted average value.

Another object of the present invention is to provide the document generating apparatus, wherein the character size correcting portion accepts designation of a character to be excluded from a calculation of the weighted average value, and excludes the designated character to calculate the weighted average value.

Another object of the present invention is to provide the document generating apparatus, wherein the character size correcting portion accepts designation of a threshold according to a rate of the number of the designated characters relative to the total number of characters in each line, and excludes the designated character to calculate the weighted average value when the rate is the threshold or more.

Another object of the present invention is to provide the document generating apparatus, wherein the character size correcting portion accepts designation of a character type to be excluded from a calculation of the weighted average value, and excludes the designated character type of a character to calculate the weighted average value.

Another object of the present invention is to provide the document generating apparatus, wherein the character size correcting portion accepts designation of the threshold according to the rate of the number of the characters of the designated character type relative to the total number of characters in each line, and excludes the designated character type of a character to calculate the weighted average value when the rate is the threshold or more.

Another object of the present invention is to provide the document generating apparatus, further comprising a line space correcting portion for correcting, for each character area, information on a line space of each character area based on the information on a character size corrected by the character size correcting portion, wherein the display form information generating portion generates the information on the display form of the supplementary explanation character string based on information on a line space corrected by the line space correcting portion.

Another object of the present invention is to provide the document generating apparatus, wherein the line space correcting portion corrects the information on the line space by calculating an average value of each line space between lines, then compares an average value of line spaces of successive m lines including a first line of one character area to a line space between an m-th line and an (m+1)-th line, and excludes the line space between the m-th line and the (m+1)-th line from a calculation of the average value of each line space between lines when a difference between the average value of the line spaces of the successive m lines and the line space between the m-th line and the (m+1)-th line is judged large based on a predetermined condition.

Another object of the present invention is to provide the document generating apparatus, wherein the display form information generating portion generates information on a display form of a translation, reading or annotation of a character included in the document as the information on a display form of the supplementary explanation character string.

Another object of the present invention is to provide the document generating apparatus, further comprising a translation processing portion for performing word by word, collocation by collocation, or phrase by phrase translation of a word, a collocation, or a phrase included in the document, wherein the document generating portion generates a document with a supplementary explanation in which a translation is given word by word, collocation by collocation, or phrase by phrase.

Another object of the present invention is to provide a document generating method for generating a document with a supplementary explanation in which a supplementary explanation character string is given in a ruby form alongside a character included in a document, comprising: a first character size correction step of reading information on a character size of a character included in each character area in the document from a storage portion storing the information on the character size and correcting the read information on the character size for each character area based on a character size of each character area; a character area division step of dividing one character area into more than one character area based on information on a character size corrected at the first character size correction step; a second character size correction step of correcting information on a character size for a character in a character area made by division at the character area division step; a display form information generation step of generating information on a display form of the supplementary explanation character string per character area made by division at the character area division step based on information on a character size corrected at the second character size correction step; and a document generation step of generating the document with the supplementary explanation based on information on a display form generated at the display form information generation step.

Another object of the present invention is to provide a computer program that causes a computer to execute the document generating method.

Another object of the present invention is to provide a computer-readable recording medium, wherein the computer program is recorded.

PREFERRED EMBODIMENTS OF THE INVENTION

Figure 1:
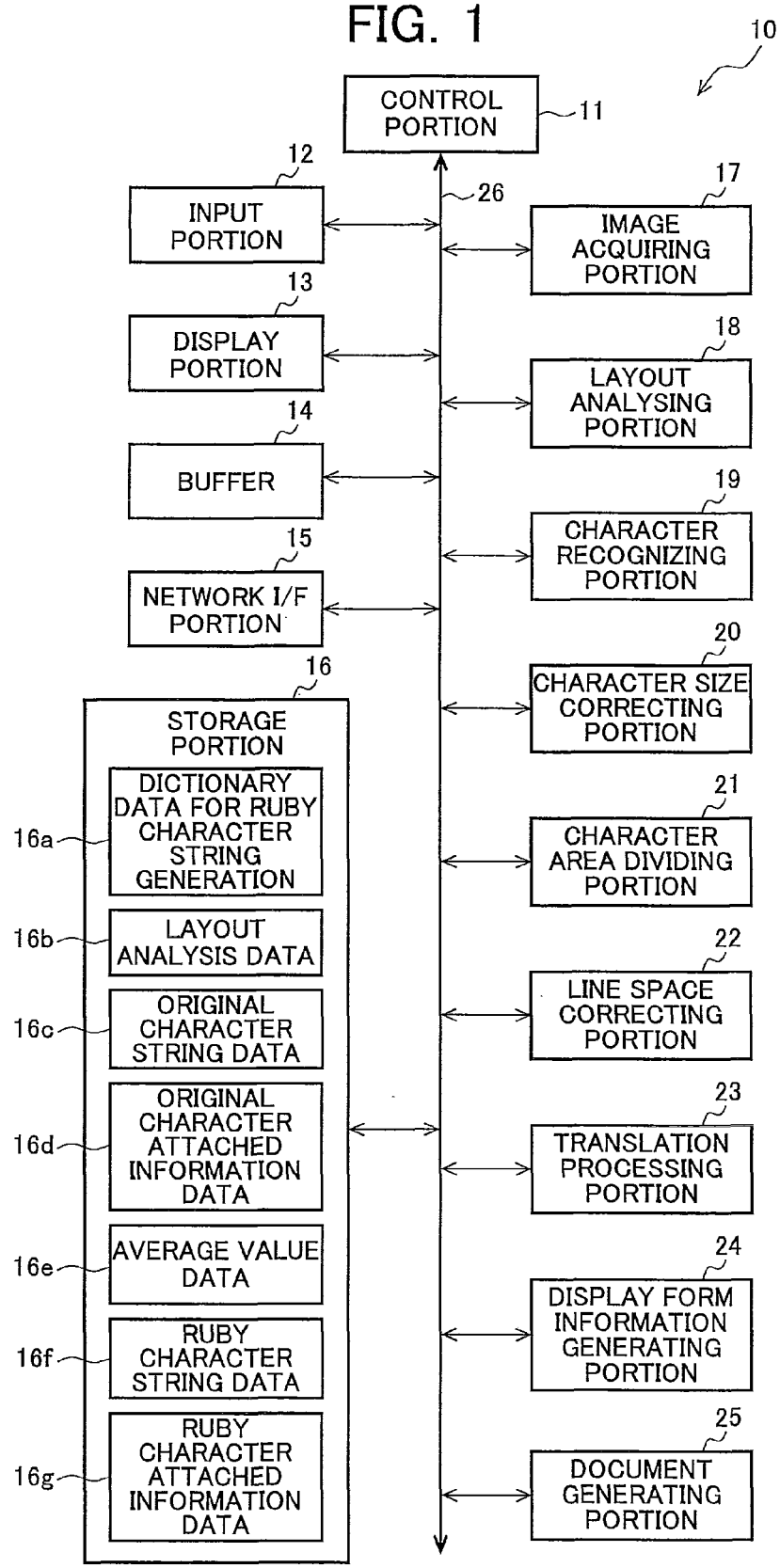
FIG. 1 is a functional block diagram of a document generating apparatus according to an embodiment of the present invention.

Hereinafter, description will be given in detail for embodiments of the present invention with reference to the drawings. FIG. 1 is a functional block diagram of a document generating apparatus 10 according to an embodiment of the present invention. The document generating apparatus 10 is an apparatus for generating a document with a supplementary explanation (hereinafter, referred to as a document with a ruby character) by giving a supplementary explanation character string in a ruby form (hereinafter, referred to as a ruby character) alongside a character included in a document. The ruby characters are annotation showing reading, meaning or the like of a character (for example, a syllabic character, a phonetic symbol, a pinyin symbol, a translation and description of a technical term or a hard word), and to be arranged near the character so that a correspondence relation to the character is understood.

Note that, hereinafter, description will be given for the document generating apparatus 10 with an example in the case of giving a translation in Japanese as a ruby character alongside an English character, however, the present invention may also be applied to a case where annotation showing reading, meaning or the like of a character is given as a ruby character so that it is possible to use the present invention for a wide range of application. Further, hereinafter, description will be given for a case where a translation is given in a document in horizontal writing, however, it is also possible to easily apply the present invention to a case where a translation is given in a document in vertical writing.

As shown in FIG. 1, the document generating apparatus 10 is provided with a control portion 11, an input portion 12, a display portion 13, a buffer 14, a network I/F (Interface) portion 15, a storage portion 16, an image acquiring portion 17, a layout analysing portion 18, a character recognizing portion 19, a character size correcting portion 20, a character area dividing portion 21, a line space correcting portion 22, a translation processing portion 23, a display form information generating portion 24 and a document generating portion 25. Respective function portions are connected to each other via a bus 26.

The control portion 11 is a processing portion for entirely controlling the document generating apparatus 10. This control portion 11 is responsible for sending or receiving of data among respective function portions. The input portion 12 is an input device such as a keyboard and a mouse. The display portion 13 is a display device such as a display. The buffer 14 is a storage device which is comprised of a memory (for example, RAM (Random Access Memory) and the like, and temporarily stores data. The network I/F portion 15 is a network interface for communicating with an external device via an IP (Internet Protocol) network such as a LAN (Local Area Network) and a WAN (Wide Area Network).

The storage portion 16 is a storage device such as a memory (for example, a flash ROM (Read Only Memory), an EEPROM (Electrically Erasable and Programmable Read Only Memory)) and a hard disk device. This storage portion 16 stores dictionary data for ruby character string generation 16a, layout analysing data 16b, original character string data 16c, original character attached information data 16d, average value data 16e, ruby character string data 16f and ruby character attached information data 16g.

The dictionary data for ruby character string generation 16a is data including an English word or collocation as well as a translation in Japanese for them and the like together with grammar data of English and Japanese and data of an appearance frequency of each syntax. Here, the collocation is a phrase in which more than one word is coupled to each other to show one organized meaning (for example, a noun phrase, a verbal phrase, an idiom, an idiomatic phrase and the like). The layout analysing data 16b is data showing a result of layout analysing of an original document image by the layout analysing portion 18. Specifically, the layout analysing data 16b includes information on positions and sizes of a character area, an image area, a blank, and the like included in an original document image.

The original character string data 16c is text information of each character acquired as a result of character recognition of an original document image by the character recognizing portion 19. The original character attached information data 16d is data of a position, a size and the like of each character acquired as a result of character recognition of an original document image. The average value data 16e is data of average values of a character size and a line space in each character area. The ruby character string data 16f is data of a translation that is generated by the translation processing portion 23 as a ruby character string. The ruby character attached information data 16g is data of a position, a size and the like of the translation generated by the translation processing portion 23 as the ruby character string.

Here, there is no need to store data in the storage portion 16 in advance, and for example, data stored in an external memory may be read by a driver to be stored in the storage portion 16. Further, data may be downloaded from an external device via the network I/F portion 15 to be stored in the storage portion 16.

The image acquiring portion 17 acquires image data of an original document image including a character image. For example, the image acquiring portion 17 acquires, when a flatbed scanner, a film scanner or the like is connected to the document generating apparatus 10 via the network I/F portion 15, or when the document generating apparatus 10 has such a scanner, image data that is read by such a scanner.

The layout analysing portion 18 is a processing portion for analyzing a layout of an original document image that is acquired by the image acquiring portion 17. Specifically, the layout analysing portion 18 analyzes layouts of a character area, an image area, a blank and the like included in an original document image to detect a position and a size of each area. Then, the layout analysing portion 18 stores information on a position, a size and the like of each area in the storage portion 16 as the layout analysing data 16b.

The character recognizing portion 19 is a processing portion for recognizing a character included in the character area that is detected by the layout analysing portion 18 to convert the recognized character into text information. Moreover, the character recognizing portion 19 performs processing for detecting a position, a size and the like of the recognized character. Then, the character recognizing portion 19 stores the text information in the storage portion 16 as the original character string data 16c, as well as stores information on a position, a size and the like of the detected character in the storage portion 16 as the original character attached information data 16d.

The layout analysing portion 18 and the character recognizing portion 19 analyze an layout of an original document image, for example, with use of the same technique as a character recognition technique that has been conventionally used in OCR (Optical Character Recognition) and the like, thereby detecting a character area, and further performs character recognition of each character image in the detected character area for converting into text information.

The character size correcting portion 20 is a processing portion for performing correction of an original character size that is recognized by the character recognizing portion 19. Specifically, for each character area, the character size correcting portion 20 calculates an average value of a character size in each line that is acquired as a result of character recognition by the character recognizing portion 19, thereby performing correction of an original character size. Here, the character size correcting portion 20 calculates a character size in each line, for example, by calculating an average value of character sizes of characters included in each line. The corrected original character size is used for setting a character size of a ruby character. Note that, a character size in each line may be calculated by means of another method in which a median, a mode and a maximum value of character sizes of characters included in each line are used, and the like.

Thereby, even when character sizes recognized by the character recognizing portion 19 are not uniform, it is possible to unify character sizes of ruby characters per character area, and even when an extremely small character or an extremely large character is included in a character area, it is possible to set the character size of the ruby character appropriately.

Figure 2:
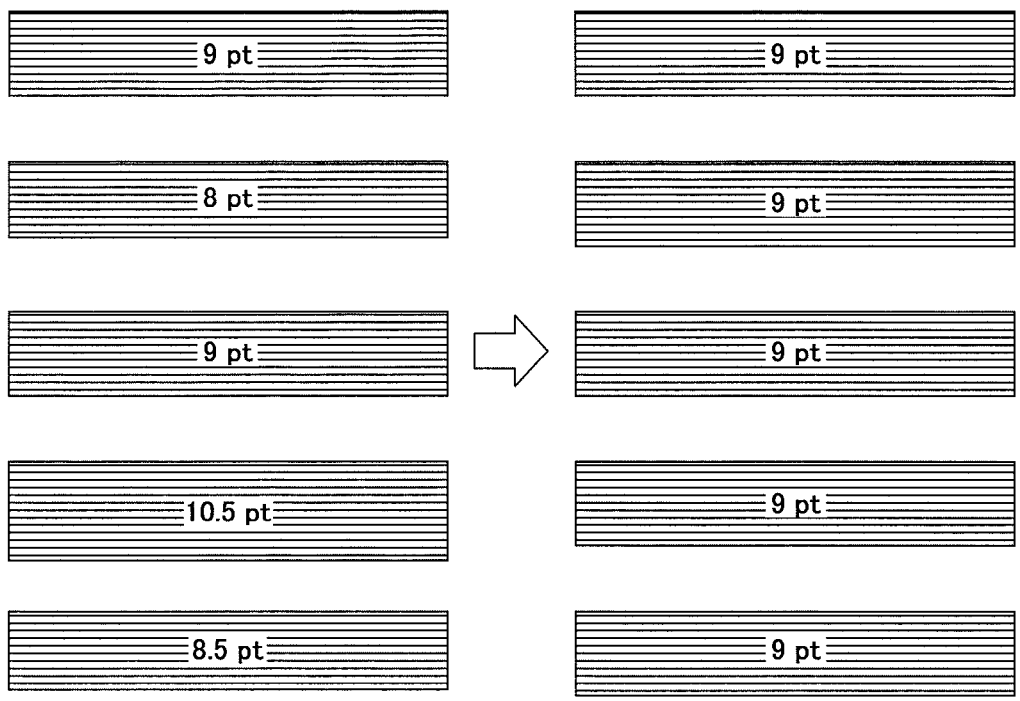
FIG. 2 is a diagram showing an example of correction of an original character size.

FIG. 2 is a diagram showing an example of correction of an original character size. As shown in FIG. 2, for example, it is assumed that in a character area with 5 lines, a character size in each line that is recognized by the character recognizing portion 19 is 9 points, 8 points, 9 points, 10.5 points or 8.5 points. In this case, the average value becomes 9 points. Therefore, as shown in FIG. 2, the character size correcting portion 20 corrects character sizes of characters included in this character area to 9 points.

Note that, when the number of characters included in a line does not satisfy a predetermined threshold in the above-described processing, an average value may be calculated by excluding such a line. In a case where a part that is not a character is accidentally recognized as a character so that the number of characters in a line including characters which are accidentally recognized is expected to lessen, and the like, it is possible to calculate an average value of an appropriate character size by excluding such a line.

Further, the character size correcting portion 20 may calculate a weighted average value by adding a weight of the number of characters included in each line to a character size in each line to perform correction of an original character size with use of the calculated weighted average value.

For example, it is assumed that in a character area with 2 lines, a character size is 10 points and the number of characters is 30 characters in a first line while a character size is 20 points and the number of characters is 1 character in a second line. In this case, an average value becomes (10+20)/2=15 points, however, it is difficult to say that this average value represents an average character size. On the other hand, the weighted average value becomes (10×30+20×1)/(30+1)= 10.3 points. In this manner, the character size correcting portion 20 is able to calculate an average character size more appropriately by using the weighted average value so that it is possible to effectively perform correction of an original character size.

In calculation of a weighted average value, the character size correcting portion 20 may accept designation of a character or a character type to be excluded from a calculation target of the weighted average value, and exclude a designated character or a designated character type of a character to calculate the weighted average value. The character or the character type to be excluded may be stored in the storage portion 16 of the document generating apparatus 10 in advance, or may accept designation from a user. Alternatively, when a content rate of a designated character or a designated character type of a character (for example, a special character such as a symbol), that is, a rate of the number of designated characters or the designated character type of characters relative to the total number of characters in each line is a predetermined threshold or more, the character or the character type of a character may be excluded from a calculation target of an average value. This threshold may be stored in the storage portion 16 of the document generating apparatus 10, or may be designated by a user.

The character recognizing portion 19 accidentally recognizes as a character a symbol string such as " . . . " that is used for connecting a headline to a page number in a table of contents of a document in some cases, however, as described above, such a symbol string is excluded from a calculation target of an average value so that it is possible to calculate an average value of an appropriate character size.

Figure 3:
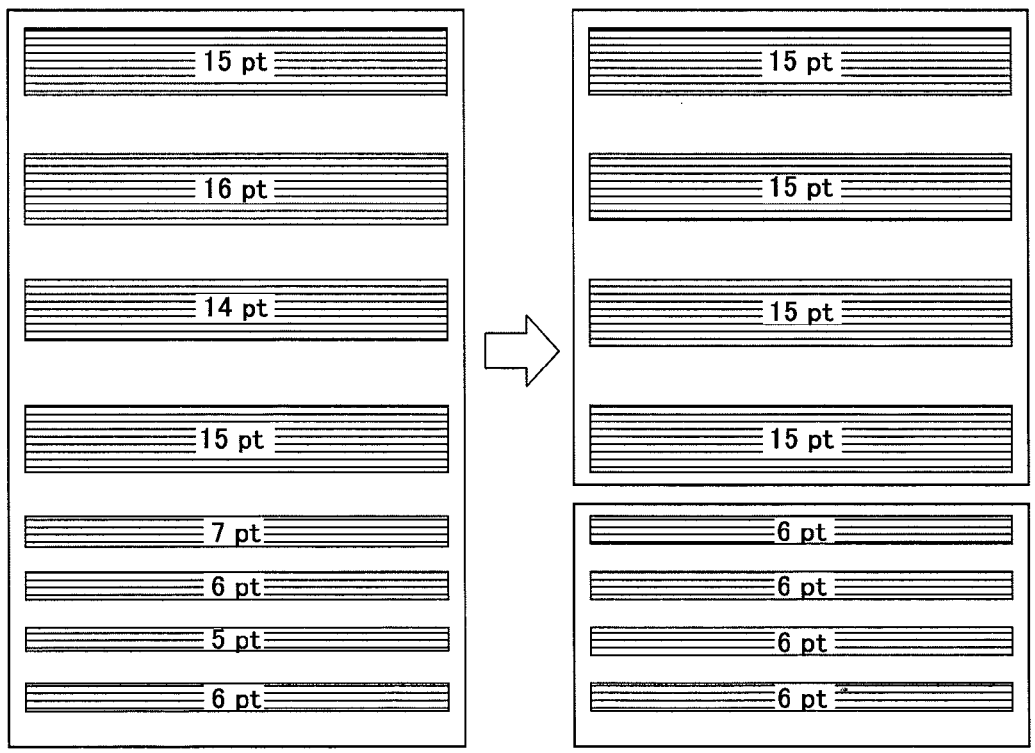
FIG. 3 is a diagram showing another example of correction of an original character size.

Additionally, when characters whose sizes are greatly different from the other characters are included in an original document, the character size correcting portion 20 may calculate an average value of character sizes by excluding character sizes of those characters as outliers, and perform correction of an original character size with use of the calculated average value. FIG. 3 is a diagram showing another example of correction of an original character size. As shown in FIG. 3, for example, in a character area with 8 lines, it is assumed that a character size in each line recognized by the character recognizing portion 19 is 15 points, 16 points, 14 points, 15 points, 7 points, 6 points, 5 points, or 6 points.

The character size correcting portion 20, in order to calculate an average value of character sizes from a first line to an n-th line (n>1) in a certain character area, in the case of acquiring information on a character size in the n-th line, compares a character size in the n-th line to an average value of character sizes from the first line to an n−1-th line. Then, the character size correcting portion 20 replaces, when a difference between the character size in the n-th line and the above-described average value is judged large based on a predetermined condition, the character sizes from the first line to the n−1-th line with the average value to correct the sizes of characters included in lines from the first line to the n−1-th line. The predetermined condition is, for example, a condition that A is twice as much as B or more where a larger value is A and a smaller value is B between the character size in the n-th line and the average value. After correction of the character sizes, the character size correcting portion 20 continues processing for calculating an average value for lines after the n-th line.

When the difference between the character size in the n-th line and the average value is not judged large based on the predetermined condition, the character size correcting portion 20 acquires information on a character size in an n+1-th line for calculating an average value of the character size from the first line to the n+1-th line, and continues the same processing as the above-described processing.

In an example of FIG. 3, it is assumed that the number of characters included in a line is the predetermined threshold or more. The character size correcting portion 20 acquires information that a character size in a second line is 16 points in calculation of an average value between a first line and a second line. In this case, since an average value (character size in the first line) is 15 points and a character size in the second line (16 points) is not larger than twice as much as the average value, the character size correcting portion 20 acquires information that a character size in a third line is 14 points. The character size correcting portion 20 repeats the same processing, and acquires information that a character size in a fifth line is 7 points.

An average value of character sizes from the first line to a fourth line is 15 points, and this value is larger than twice as much as the character size in the fifth line which is 7 points. Therefore, as shown in FIG. 3, the character size correcting portion 20 replaces the character sizes from the first line to the fourth line with 15 points as the average value to correct character sizes included in lines from the first line to the fourth line.

Thereafter, the character size correcting portion 20 continues processing for calculating an average value for lines after the fifth line. Specifically, the character size correcting portion 20 acquires information that a character size in a sixth line is 6 points in calculation of an average value between the fifth line and the sixth line. In this case, since an average value (character size in the fifth line) is 7 points and a character size in the sixth line (6 points) is not larger than twice as much as the average value, the character size correcting portion 20 acquires information that a character size in the third line is 5 points. The character size correcting portion 20 repeats the same processing up to an eighth line, and acquires a value of 6 points as an average value of character sizes from the fifth line to the eighth line. Since the eighth line is the last line in a character area, as shown in FIG. 3, the character size correcting portion 20 replaces the character sizes from the fifth line to the eighth line with 6 points as the average value to correct sizes of characters included in lines from the fifth line to the eighth line.

Thereby, for example, even when a line with a character size that is greatly different from a character size in another line in a certain character area, the character size correcting portion 20 sets a target line for calculating an average value corresponding to a character size, thereby making it possible to calculate an average value of an appropriate character size.

The character area dividing portion 21 is a processing portion for dividing a character area so that character sizes become nearly uniform in a case where characters in sizes that are greatly different from each other are included in a character area detected by the layout analysing portion 18. This character area dividing portion 21 functions in conjunction with the character size correcting portion 20. Specifically, when the character size correcting portion 20 acquires information on a character size in the n-th line, calculates the average value of character sizes from the first line to the n-th line, and judges that the difference between the character size in the n-th line and the average value of character sizes from the first line to the n−1-th line is large based on the predetermined condition, the character area dividing portion 21 divides the character area into a character area including the first line to the n−1-th line and a character area including lines after the n-th line.

Thereby, for example, even when characters whose sizes are greatly different from the other characters are included in one character area by errors in layout analysing processing by the layout analysing portion 18, the character area is divided into a plurality of character areas including characters in nearly same sizes. Thus, it is possible to calculate an appropriate average value of character sizes in each character area, and to appropriately set a character size of a ruby character with use of the average value. Further, the character size correcting portion 20 and the character area dividing portion 21 respectively perform judgment, each time proceeding processing by line, whether to perform correction of character sizes in the line and whether to divide character areas. Such judgment processing is especially effective in the case that each time correction of a character size is performed and furthermore a division spot of a character area is decided, translation of a character string and generation of a ruby character in the character area are performed. That is, it is possible to proceed translation processing and generation processing of a ruby character for a character area in which correction of a character size is performed and a division spot is decided, and it is thus possible to promptly execute processing for giving a ruby character for a character string in such a character area.

The line space correcting portion 22 is a processing portion for correcting a line space in each character area that is divided by the character area dividing portion 21 with use of information on an original character size that is corrected by the character size correcting portion 20. Specifically, for each character area, the line space correcting portion 22 calculates an average value of each line space between lines in a case where each original character is arranged in a character size that is corrected by the character size correcting portion 20 to correct a line space with use of the calculated average value. It is assumed here that the line space correcting portion 22 arranges each original character in a character size that is corrected so that a center position of each original character in the character size that is corrected conforms to a center position of each original character before the size is corrected. Then, the line space correcting portion 22 calculates each line space in lines by calculating a difference between a coordinate of a lower end in a certain line n and a coordinate of a lower end in a next line n+1 and deducting, from the difference, a vertical length of an original character in a line n+1 in which the character size is corrected. Note that, arrangement of each original character in a character size that is corrected may be anything else.

Information on the corrected line space is used for deciding an arrangement position of a translation. This makes it possible to easily and effectively generate a document with a ruby character in which a translation is given as a ruby character in a position that conforms to a line space in a document.

For example, the line space correcting portion 22 calculates a line space from a difference between a coordinate at a lower end of a first character in each line and a coordinate at an upper end of a first character in a next line of that line that are comprised of original characters in character sizes that are corrected. Then, in each character area, the line space correcting portion 22 calculates an average value of line spaces each time a line space is calculated line by line. Note that, here, description is given for the case of a document in horizontal writing, however, in the case of a document in vertical writing, a line space may be calculated from a difference between a leftmost coordinate of a first character in a row and a rightmost coordinate of a first character in a next row of that row.

The line space correcting portion 22, in a certain character area, compares a line space between an m−1-th line and an m-th line to an average value of each line space between lines from a first line to the m−1-th line in the case of acquiring information on a line space between the m−1-th line and the m-th line in order to calculate an average value of each line space between lines from the first line to the m-th line (m>2). Then, the line space correcting portion 22 excludes the line space between the m−1-th line and the m-th line from a calculation target of an average value as an outlier when a difference between the line space between the m−1-th line and the m-th line and the above-described average value is judged large based on a predetermined condition. The predetermined condition is a condition that A is twice as much as B or more where a larger value is A and a smaller value is B between a line space between the m−1-th line and the m-th line and the average value. Thereafter, the line space correcting portion 22 continues processing for calculating an average value for line spaces after the line space between the m-th line and an m+1-th line.

Thereby, for example, even when there is a vacant line, or an extremely wide line space or a narrow line space in a certain character area, the line space correcting portion 22 excludes the line space from a calculation of an average value, and it is thus possible to calculate an appropriate average value of line spaces and to appropriately set an arrangement position of a translation with use of the average value.

The translation processing portion 23 performs processing for generating as a ruby character string a translation corresponding to an original character string recognized by the character recognizing portion 19. Specifically, the translation processing portion 23 generates a translation of a word or a collocation by referring to the dictionary data for ruby character string generation 16*a* per word or collocation included in an original character string, and stores the generated translation in the storage portion 16 as the ruby character string data 16*f* correspondingly to the word or the collocation. Note that, in the present embodiment, the translation processing portion 23 generates a translation per word or collocation, however, the translation processing portion 23 may generate a translation per phrase in addition to a word or a collocation. Here, the phrase is a word string comprised of a plurality of words or collocations. Since individual phrase is generally not registered in a dictionary, the translation processing portion 23 may, for example, translate a word or a collocation included in a phrase and generate translations of the whole phrase with use of the translation result. Alternatively, a translation of a phrase may be generated by means of another method.

The display form information generating portion 24 is a processing portion for generating information on an arrangement position and a character size in the case of arranging a translation generated by the translation processing portion 23 on an image. The display form information generating portion 24 stores the generated information in the storage portion 16 as the ruby character attached information data 16*g*.

Specifically, the display form information generating portion 24 sets a character size of a translation so as to be a predetermined rate relative to the character size corrected by the character size correcting portion 20. Then, the display form information generating portion 24 sets an arrangement position of a translation so that a lower end of an original character string directly above a line space for arranging a translation nearly matches with an upper end of the translation, and also adjusts an arrangement position of a translation within a range in which it is visually acknowledged that the original character string is in contact with the translation.

Alternatively, the display form information generating portion 24 may set arrangement positions of translations so that translations are arranged on a median line between lines assuming that original characters are arranged in a character size corrected by the character size correcting portion 20 and with a line space corrected by the line space correcting portion 22 for each character area detected by the layout analysing portion 18 or divided by the character area dividing portion 21. Here, the display form information generating portion 24 sets arrangement positions of translations assuming that each original character in a first line of each character area is arranged so that a center position of each original character whose character size is corrected matches with each center position of each original character before correction of the size, thereafter, each original character in each line is sequentially arranged in the character size corrected by the line space correcting portion 22 and with the line space corrected by the line space correcting portion 22. Note that, arrangement of each original character whose size is corrected may be anything else and an arrangement position of a translation may be position except a position on a median line of a line space.

In this case, the display form information generating portion 24 compares the line space corrected by the line space correcting portion 22 to the character size corrected by the character size correcting portion 20 per character area detected by the layout analysing portion 18 or character area made by division by the character area dividing portion 21 in order to set a character size of a translation.

When an original document is a document in horizontal writing and a line space is smaller than 40% of a vertical length of an original character whose size is corrected by the character size correcting portion 20, the display form information generating portion 24 sets a character size of a translation so that a vertical length of the character of the translation becomes 40% of the above-described vertical length of the original character. Additionally, when a line space exceeds 80% of the above-described vertical length of the original character, the display form information generating portion 24 sets a character size of a translation so that a vertical length of the character of the translation becomes 80% of the above-described vertical length of the original character. Further, when a line space is 40 to 80% of the above-described vertical length of the original character, the display form information generating portion 24 sets a character size of a translation so that a vertical length of the character of the translation becomes the same length as that of a line space. Note that, in the above-described processing, another threshold except 40% or 80% may be used. Moreover, even when an original document is a document in vertical writing, a horizontal length of an original character is regarded as a basis, thereby making it possible to set a character size of a translation by means of the same method.

The document generating portion 25 is a processing portion for generating a document image in which a translation is given in an original character string. Specifically, the document generating portion 25 generates a ruby information text layer in which a translation generated word by word or collocation by collocation by the translation processing portion 23 is arranged in an arrangement position set by the display form information generating portion 24 and in the set character size. Then, the document generating portion 25 overlays the generated ruby information text layer over an original document image, thereby generating a document image in which a translation is given to an original character string.

Here, the document generating portion 25 generates a document image in which a translation acquired from word by word or collocation by collocation translation process is given. In this manner, since translation is not performed sentence by sentence but translation is performed word by word or collocation by collocation, even in the case of having an error in character recognition by the character recognizing portion 19, such influence only partially extends to a part of a sentence, and it is possible to prevent the influence from extending to translation of the whole sentence.

Figure 4:
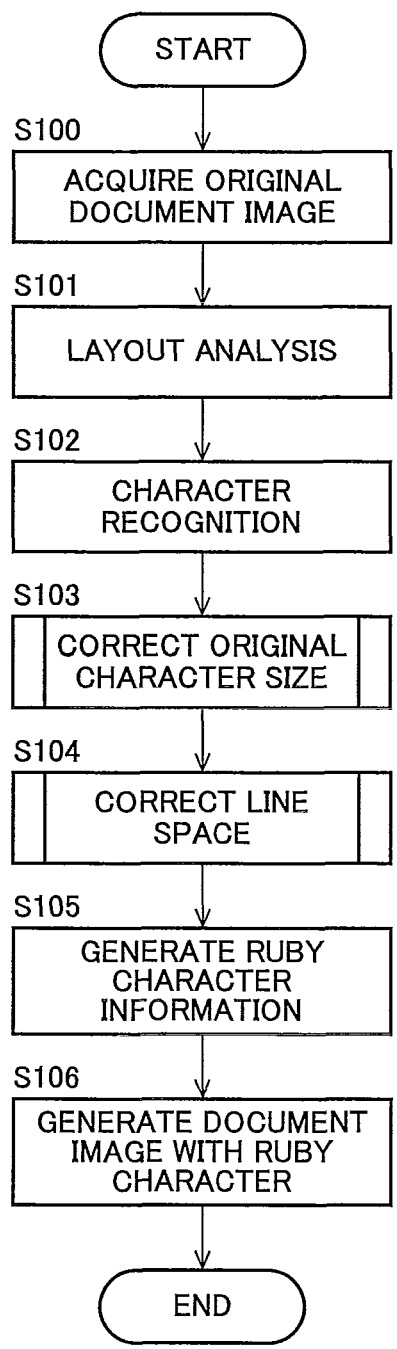
FIG. 4 is a flowchart showing an example of a processing procedure of document generating processing according to an embodiment of the present invention.

Next, description will be given for an example of a processing procedure of document generating processing according to an embodiment of the present invention. FIG. 4 is a flowchart showing an example of a processing procedure of document generating processing according to an embodiment of the present invention.

As shown in FIG. 4, the image acquiring portion 17 of the document generating apparatus 10 acquires image data of an original document image including a character image (step S100). Then, the layout analysing portion 18 executes layout analysing of the original document image acquired by the image acquiring portion 17 (step S101). Subsequently, the character recognizing portion 19 recognizes a character included in a character area detected by the layout analysing portion 18 to convert the recognized character into text information, as well as performs character recognition processing for detecting a position, a size and the like of the recognized character (step S102).

Then, the character size correcting portion 20 performs correction of an original character size recognized by the character recognizing portion 19 (step S103). Note that, in the correction processing, in the case of including characters in sizes which are greatly different from the other characters in a character area detected by the layout analysing portion 18, the character area dividing portion 21 divides a character area so that character sizes become nearly uniform. Description will be given in detail for this correction processing with reference to FIG. 5.

Subsequently, the line space correcting portion 22 corrects a line space in each character area that is divided by the character area dividing portion 21 with use of information on an original character size corrected by the character size correcting portion 20 (step S104). Description will be given in detail for this correction processing with reference to FIG. 6.

Thereafter, the translation processing portion 23 generates a translation corresponding to an original character string recognized by the character recognizing portion 19 as a ruby character string, and the display form information generating portion 24 uses information on the original character size corrected by the character size correcting portion 20 and information on a line space corrected by the line space correcting portion 22 to perform processing for generating information on an arrangement position and a character size for arranging a translation generated by the translation processing portion 23 on an image (step S105).

Then, the document generating portion 25 generates a ruby information text layer in which a translation generated by the translation processing portion 23 is arranged in an arrangement position set by the display form information generating portion 24 and in the set character size, and overlays the generated ruby information text layer over an original document image, thereby performing processing for generating a document image in which a translation is given to an original character string (step S106).

Figure 5:
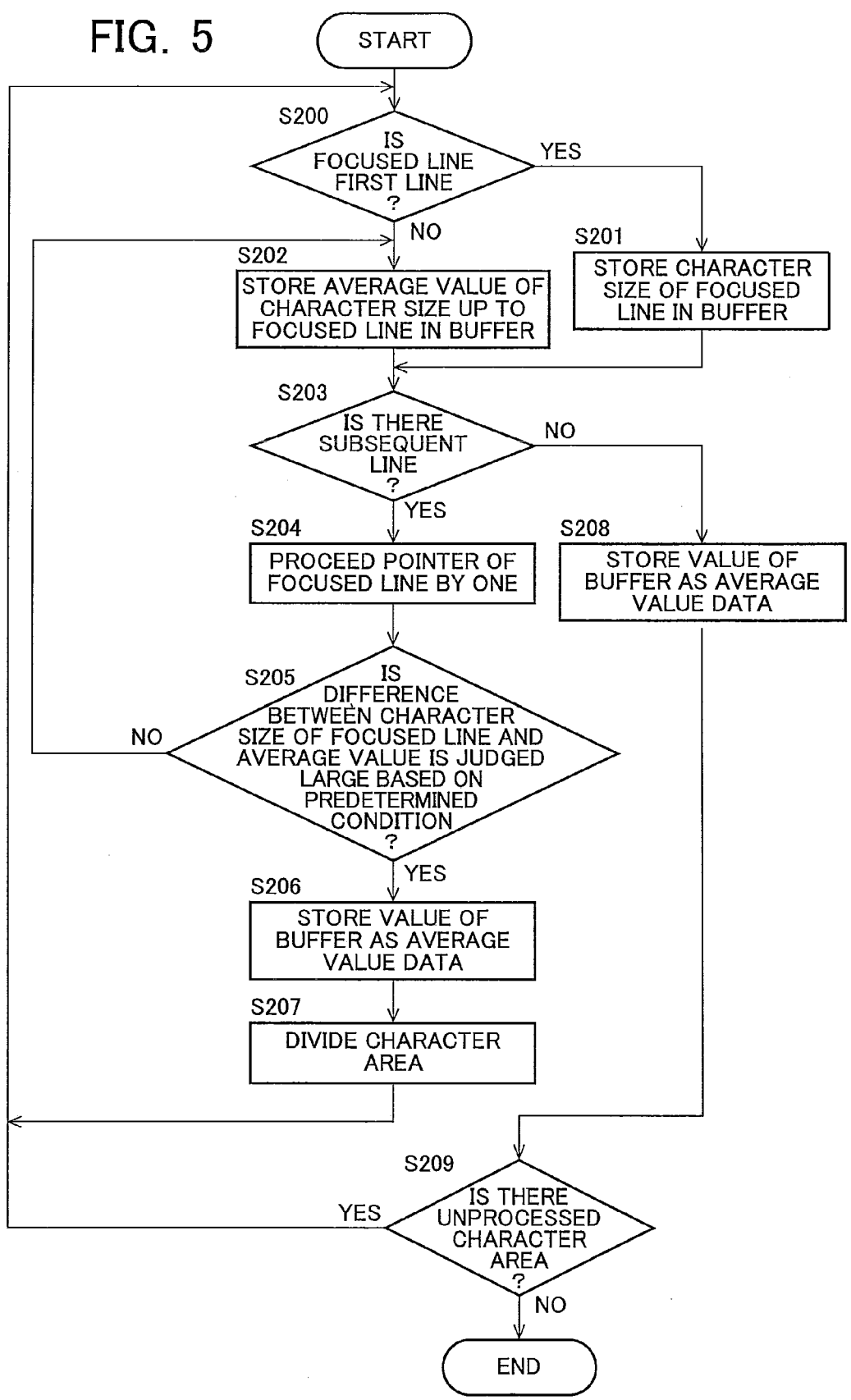
FIG. 5 is a flowchart showing an example of a processing procedure of original character size correction processing shown in FIG. 4.

Next, description will be given for an example of a processing procedure of original character size correction processing shown in FIG. 4. FIG. 5 is a flowchart showing an example of the processing procedure of the original character size correction processing shown in FIG. 4. Here, it is assumed that the original character size correction processing is started from a first line of each character area.

As shown in FIG. 5, the character size correcting portion 20 of the document generating apparatus 10 judges whether or not a line focused as a processing target is a first line of a character area thereof (step S200). Then, when the focused line is the first line of a character area thereof (in the case of YES at step S200), the character size correcting portion 20 stores a character size of the focused line in the buffer 14 (step S201). When the focused line is not the first line of a character area thereof (in the case of NO at step S200), the character size correcting portion 20 calculates an average value of a character size in each line from the first line to the focused line of the character area to store the calculated average value in the buffer 14 (step S202).

After processing at step S201 or step S202, the character size correcting portion 20 checks whether or not there is a subsequent line in the character area (step S203). In the case of no subsequent lines (in the case of NO at step S203), the character size correcting portion 20 stores a value stored in the buffer in the storage portion 16 as the average value data 16*e* by correlating the value with the character area (step S208). Then, the character size correcting portion 20 checks whether or not there is an unprocessed character area in which this original character size correction processing is not performed (step S209).

In the case that there is no unprocessed character areas (in the case of NO at step S209), the character size correcting portion 20 finishes this original character size correction processing. In the case that there is an unprocessed character area (in the case of YES at step S209), the character size correcting portion 20 moves to step S200 to perform processing for judging, for the unprocessed character area, whether or not a line focused as a processing target is a first line of a character area thereof, and continues subsequent processing.

In the case of having subsequent lines at step S203 (in the case of YES at step S203), the character size correcting portion 20 proceeds a pointer pointing a focused line by a line to set a next line as the focused line (step S204).

Thereafter, the character area dividing portion 21 checks whether or not a difference between a character size of the focused line and an average value is judged large based on the predetermined condition (step S205). When the difference is not judged large based on the predetermined condition (in the case of NO at step S205), the process proceeds to step S202, and the character size correcting portion 20 calculates an average value of a character size of each line from the first line to the focused line of the character area to perform processing for storing the calculated average value in the buffer 14.

When the difference is judged large based on the predetermined condition (in the case of YES at step S205), the character size correcting portion 20 stores the value stored in the buffer in the storage portion 16 as the average value data 16e by correlating the value with the character area (step S206). The value stored here is an average value of a character area including the line that is one line before a focused line among two divided character areas. Thereafter, the character area dividing portion 21 divides a character area into two at a space between the focused line and the line that is one line before the focused line (step S207).

Thereafter, the process proceeds to step S200, and the character size correcting portion 20 performs, for a character area including the focused line among two character areas generated as the division, checking whether or not the focused line is a first line of the character area, and continues subsequent processing.

Note that, in the above-described processing, an average value correlated with each character area and stored as the average value data 16e is a corrected original character size of each character area. The line space correcting portion 22 uses information on this corrected original character size to correct a line space in each character area. Further, the display form information generating portion 24 uses information on the corrected original character size to generate an arrangement position and a character size for arranging a translation on an image.

Figure 6:
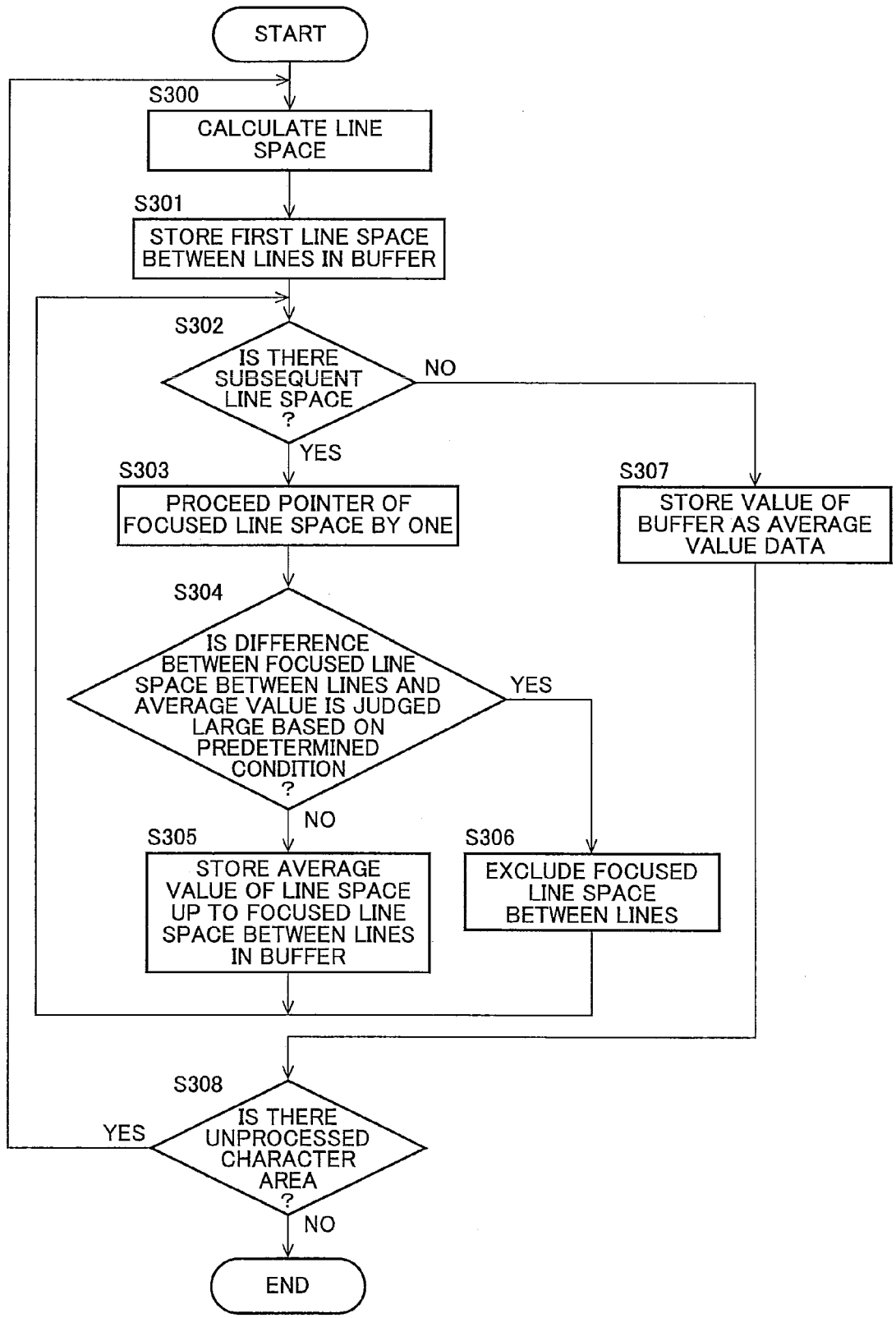
FIG. 6 is a flowchart showing an example of a processing procedure of line space correction processing shown in FIG. 4.

Next, description will be given for an example of a processing procedure of line space correction processing shown in FIG. 4. FIG. 6 is a flowchart showing an example of the processing procedure of the line space correction processing shown in FIG. 4. It is assumed here that the line space correction processing is started from a first line space of each character area, that is, a line space between the first line and a subsequent line of each character area.

As shown in FIG. 6, the line space correcting portion 22 of the document generating apparatus 10 calculates each line space between lines when each original character is arranged in a character area intended for processing in a character size corrected by the character size correcting portion 20 (step S300). Then, the line space correcting portion 22 stores a first line space between lines of the character area in the buffer 14 (step S301). Subsequently, the line space correcting portion 22 checks whether or not there is a subsequent line in the character area (step S302). In the case of no subsequent lines (in the case of NO at step S302), the line space correcting portion 22 stores a value stored in the buffer in the storage portion 16 as the average value data 16e by correlating the value with the character area (step S307). Then, the line space correcting portion 22 checks whether or not there is an unprocessed character area in which this line space correction processing is not performed (step S308).

In the case of no unprocessed character areas (in the case of NO at step S308), the line space correcting portion 22 finishes this line space correction processing. In the case of having an unprocessed character area (in the case of YES at step S308), the process proceeds to step S300, and the line space correcting portion 22 performs processing for calculating each line space between lines for the unprocessed character area, and continues subsequent processing.

In the case of having subsequent line spaces at step S302 (in the case of YES at step S302), the line space correcting portion 22 proceeds a pointer pointing a focused line space by a line space to set a next line space as the focused line space (step S303).

Thereafter, the line space correcting portion 22 checks whether or not a difference between the focused line space and an average value is judged large based on the predetermined condition (step S304). When the difference is not judged large based on the predetermined condition (in the case of NO at step S304), the line space correcting portion 22 calculates an average value of each line space between lines from a first line space to the focused line space of the character area to perform processing for storing the calculated average value in the buffer 14 (step S305).

When the difference is judged large based on the predetermined basis (in the case of YES at step S304), the line space correcting portion 22 excludes the focused line space from a calculation of an average value (step S306). Then, the process proceeds to step S302, and the line space correcting portion 22 checks whether or not there is a subsequent line space in the character area, and continues subsequent processing.

Note that, in the above-described processing, an average value correlated with each character area and stored as the average value data 16e is a corrected line space of each character area. The display form information generating portion 24 uses information on the corrected line space to generate information on an arrangement position for arranging a translation on an image.

Note that, in the above-described embodiment, after correction of an original character size, division of a character area and correction of a line space are completed for all character areas, the translation processing portion 23 generates a ruby character string and the display form information generating portion 24 sets an arrangement position and a character size of the ruby character string, however, even when the above-described processing is not completed for all character areas, generation processing of the ruby character string and setting processing of the arrangement position and the character size of the ruby character string may be executed by starting from a character area in which correction of an original character size, division of a character area and correction of a line space are completed.

In this manner, description has been given with a focus on embodiments of the document generating apparatus 10 and the document generating method so far, however, the present invention is not limited to these embodiments, and the present invention may be performed as a form of a computer program for realizing functions of the document generating apparatus 10, or a form of a computer-readable recording medium in which the computer program is recorded.

Here, as the recording medium, ones in various forms are able to be employed including disc types (for example, a magnetic disc, an optical disc and the like), card types (for example, a memory card, an optical card and the like), semiconductive memory types (for example, a ROM, a nonvolatile memory and the like), tape types (for example, a magnetic tape, a cassette tape and the like), and the like.

The above-described computer programs that realize the functions of the document generating apparatus 10 of the present embodiment or computer programs that cause a computer to execute the document generating method are recorded on these recording media to be distributed, thereby making it possible to improve cost reduction, portability and general versatility.

Subsequently, the above-described recording medium is equipped with a computer, then the computer program that is recorded in the recording medium is read by the computer to be stored in a memory, and a processor (CPU: Central Processing Unit, MPU: Micro Processing Unit) provided in the computer reads and executes the computer program from the memory, so that it is possible to realize the functions of the document generating apparatus 10 according to the present embodiment and execute the document generating method.

Additionally, the present invention is not limited to the above-described embodiments, and various changes and modifications are able to be made without departing from the spirit of the present invention.

As described above, according to the present invention, when a character size of a character included in a document is corrected, a character area is divided based on information on the corrected character size, and information on a character size is corrected for characters in a character area made by division, information on a display form of a supplementary explanation character string in a ruby form is generated based on information on the corrected character size per character area made by division to generate a document with a supplementary explanation based on the generated information on the display form, and it is thus possible to easily and effectively generate a document with a supplementary explanation in which a supplementary explanation character string in a ruby form is given in a character size conforming to a character size of a document.

The invention claimed is:

1. A document generating apparatus for generating a document with a supplementary explanation by giving a supplementary explanation character string in a ruby form alongside a character included in the document, the document generating apparatus comprising:
 a storage circuit configured to store information on a character size of the character included in a character area in the document;
 a character size correcting circuit configured to read the information on the character size from the storage circuit and correct the read information on the character size for each character area based on the character size of each character area;
 a character area dividing circuit configured to divide one character area into more than one character area based on information on the character size corrected by the character size correcting circuit;
 a display form information generating circuit configured to generate, when information on the character size is corrected by the character size correcting circuit for characters in the character area made by division by the character area dividing circuit, information on a display form of the supplementary explanation character string in the ruby form for each character area made by division by the character area dividing circuit based on information on the corrected character size; and
 a document generating circuit configured to generate the document with the supplementary explanation based on information on the display form generated in the display form information generating circuit, wherein the character size correcting circuit is configured to decide, for each line, the character size for characters included in each line in each character area, calculate an average value of the decided character size for each character area, and correct information on the character size based on the calculated average value of the character size,
 the character size correcting circuit is configured to compare, in the case of calculating an average value of each character size decided for successive n lines including a first line of one character area and thereafter calculating an average value of the character size decided for each line from the first line to an n+1-th line, the average value of each character size decided for the successive n lines to the character size decided for the n+1-th line,
 when a difference between the average value of each character size decided for the successive n lines and the character size decided for the n+1-th line is determined to be greater than a predetermined condition, stops calculation of the average value of the character size decided for each line from the first line to the n+1-th line and corrects information on the character size based on the average value of each character size decided for the successive n lines, and
 n is greater than or equal to 1.

2. The document generating apparatus as defined in claim 1, wherein
 the character area dividing circuit is configured to divide, when a difference between the average value of each character size decided for the successive n lines and the character size decided for the n+1-th line is determined to be greater than the predetermined condition, the character area at a space between the n-th line and the n+1-th line.

3. The document generating apparatus as defined in claim 2, wherein
 the character size correcting circuit is configured to calculate, when the character area is divided by the character area dividing circuit, an average value of character sizes decided for lines after the n+1-th line.

4. A document generating apparatus for generating a document with a supplementary explanation by giving a supplementary explanation character string in a ruby form alongside a character included in the document, the document generating apparatus comprising:
 a storage circuit configured to store information on a character size of the character included in a character area in the document;
 a character size correcting circuit configured to read the information on the character size from the storage circuit and correct the read information on the character size for each character area based on the character size of each character area;
 a character area dividing circuit configured to divide one character area into more than one character area based on information on the character size corrected by the character size correcting circuit;
 a display form information generating circuit configured to generate, when information on the character size is corrected by the character size correcting circuit for characters in the character area made by division by the character area dividing circuit information on a display form of the supplementary explanation character string in the ruby form for each character area made by division by the character area dividing circuit based on information on the corrected character size; and
 a document generating circuit configured to generate the document with the supplementary explanation based on information on the display form generated in the display
form information generating circuit, wherein the character size correcting circuit is configured to decide,
for each line, the character size for characters included in
each line in each character area, calculate an average
value of the decided character size for each character
area, and correct information on the character size based
on the calculated average value of the character size, the character size correcting circuit is configured to calculate, when there is a line in which the number of characters does not satisfy a predetermined threshold, an
average value of the character size excluding the line,
and the character size correcting circuit is configured to calculate a weighted average value of the character size
decided for each line in the character area by adding a
weight of the number of characters included in each line
to the character size decided for each line to correct
information on the character size based on the weighted
average value.

5. The document generating apparatus as defined in claim 4, wherein the character size correcting circuit is configured to accept
designation of a character to be excluded from a calculation of the weighted average value, and exclude the
designated character to calculate the weighted average
value.

6. The document generating apparatus as defined in claim 5, wherein the character size correcting circuit is configured to accept
designation of a threshold according to a rate of the
number of the designated characters relative to the total
number of characters in each line, and exclude the designated character to calculate the weighted average
value when the rate is the threshold or more.

7. The document generating apparatus as defined in claim 4, wherein the character size correcting circuit is configured to accept
designation of a character type to be excluded from a
calculation of the weighted average value, and exclude
the designated character type of a character to calculate
the weighted average value.

8. The document generating apparatus as defined in claim 7, wherein the character size correcting circuit is configured to accept
designation of the threshold according to the rate of the
number of the characters of the designated character
type relative to the total number of characters in each
line, and exclude the designated character type of a
character to calculate the weighted average value when
the rate is the threshold or more.

9. A document generating apparatus for generating a document with a supplementary explanation by giving a supplementary explanation character string in a ruby form alongside
a character included in the document the document generating apparatus comprising:

a storage circuit configured to store information on a character size of the character included in a character area in
the document;

a character size correcting circuit configured to read the
information on the character size from the storage circuit
and correct the read information on the character size for
each character area based on the character size of each
character area;

a character area dividing circuit configured to divide one
character area into more than one character area based
on information on the character size corrected by the
character size correcting circuit;

a display form information generating circuit configured to
generate, when information on the character size is corrected by the character size correcting circuit for characters in the character area made by division by the
character area dividing circuit, information on a display
form of the supplementary explanation character string
in the ruby form for each character area made by division
by the character area dividing circuit based on information on the corrected character size;

a document generating circuit configured to generate the
document with the supplementary explanation based on
information on the display form generated in the display
form information generating circuit; and a line space correcting circuit configured to correct, for
each character area, information on a line space of each
character area based on the information on the character
size corrected by the character size correcting circuit,
wherein the display form information generating circuit is configured to generate the information on the display form of
the supplementary explanation character string based on
information on a line space corrected by the line space
correcting circuit, the line space correcting circuit is configured to correct the
information on the line space by calculating an average
value of each line space between lines, then compare an
average value of line spaces of successive m lines
including a first line of one character area to a line space
between an m-th line and an (m+1)-th line, and exclude
the line space between the m-th line and the (m+1)-th
line from a calculation of the average value of each line
space between lines when a difference between the average value of the line spaces of the successive m lines and
the line space between the m-th line and the (m+1)-th
line is determined to be greater than a predetermined
condition, and m is greater than equal 1.

10. The document generating apparatus as defined in claim 1, wherein the display form information generating circuit is configured to generate information on a display form of a
translation, reading or annotation of a character included
in the document as the information on a display form of
the supplementary explanation character string.

11. The document generating apparatus as defined in claim 1, further comprising a translation processing circuit configured to perform word by word, collocation by collocation, or
phrase by phrase translation of a word, a collocation, or a
phrase included in the document, wherein the document generating circuit is configured to generate
the document with a supplementary explanation in
which a translation is given word by word, collocation
by collocation, or phrase by phrase.

12. A document generating method for generating a document with a supplementary explanation in which a supplementary explanation character string is given in a ruby form
alongside a character included in the document, the document
generating method comprising:

storing information on a character size the character
included in a character area in the document;

reading the information on the character size and correcting the read information on the character size for each
character area based on the character size of each character area;

dividing one character area into more than one character area based on information on the character size corrected;

generating, when information on the character size is corrected for characters in the character area made by division, information on a display form of the supplementary explanation character string in the ruby form for each character area made by division based on information on the corrected character size;

generating the document with the supplementary explanation based on information on a display form generated;

deciding for each line, the character size for characters included in each line in each character area, calculating an average value of the decided character size for each character area, and correcting information on the character size based on the calculated average value of the character size; and comparing, in the case of calculating an average value of each character size decided for successive n lines including a first line of one character area and thereafter calculating an average value of the character size decided for each line from the first line to an n+1-th line, the average value of each character size decided for the successive n lines to the character size decided for the n+1-th line, wherein when a difference between the average value of each character size decided for the successive n lines and the character size decided for the n+1-th line is determined to be greater than a predetermined condition, stops calculation of the average value of the character size decided for each line from the first line to the n+1-th line and corrects information on the character size based on the average value of each character size decided for the successive n lines, and n is greater than or equal to 1.

* * * * *